Oct. 10, 1939.  E. S. TAYLOR  2,175,999
FLEXIBLE ENGINE MOUNT
Filed July 23, 1937  2 Sheets—Sheet 2
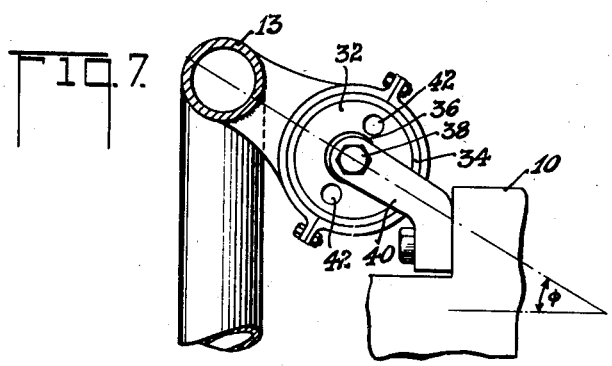
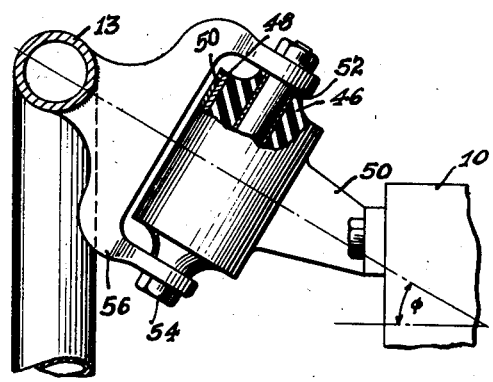
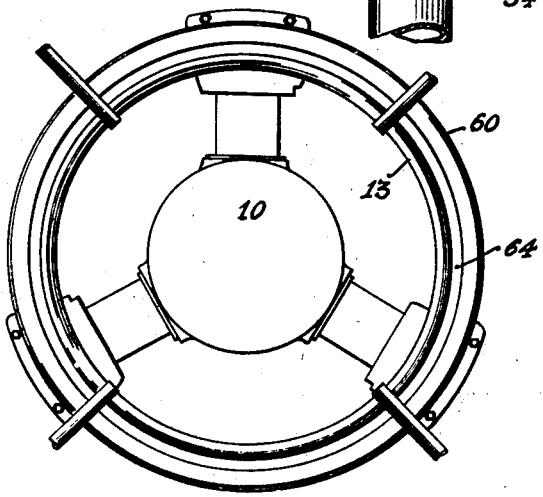
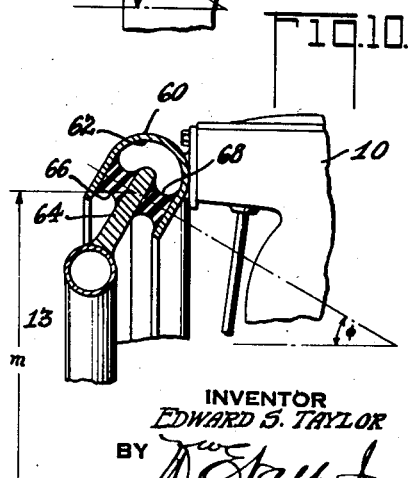
INVENTOR
*EDWARD S. TAYLOR*
BY
ATTORNEY Patented Oct. 10, 1939

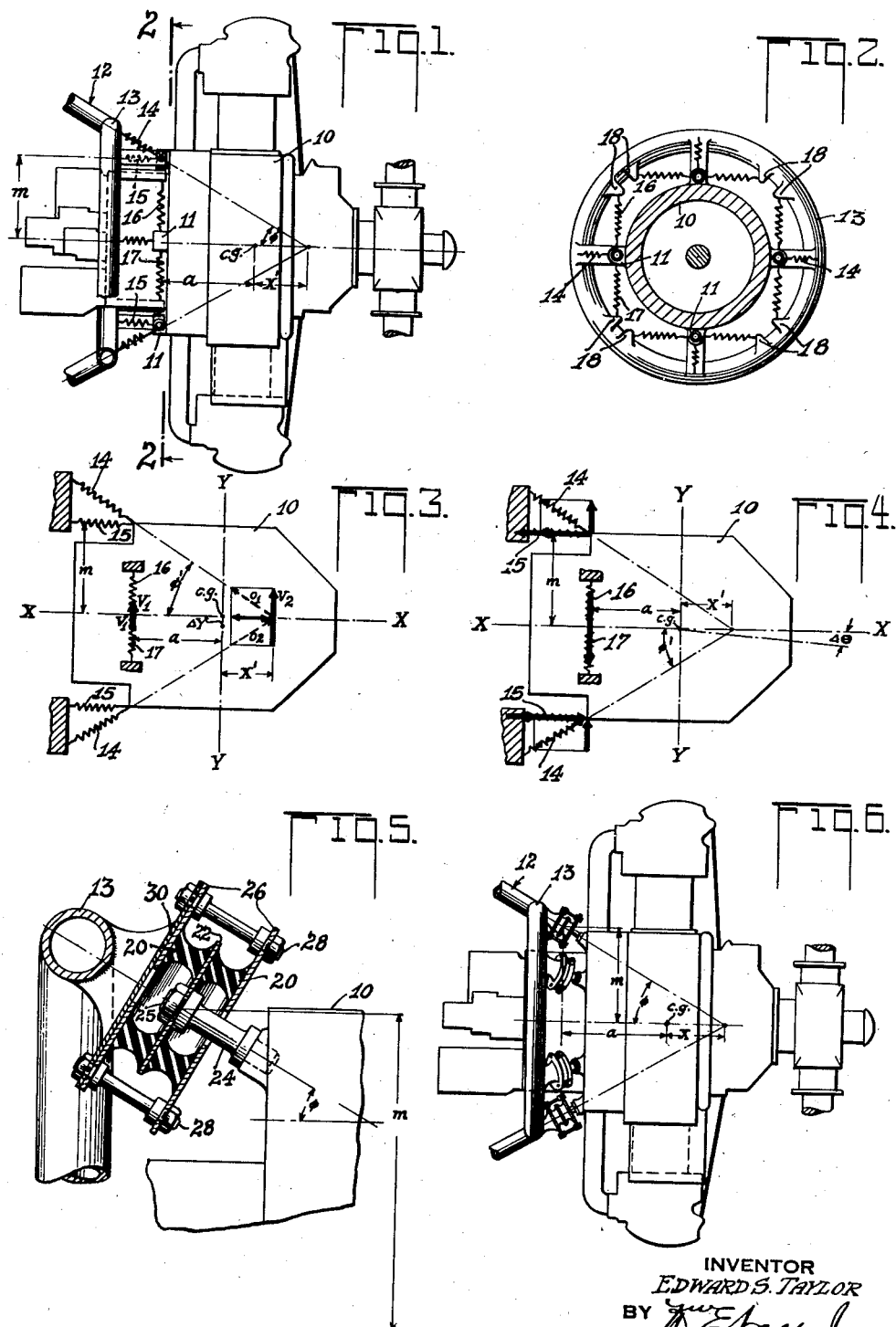

2,175,999

UNITED STATES PATENT OFFICE 2,175,999

FLEXIBLE ENGINE MOUNT

Edward S. Taylor, Cambridge, Mass., assignor, by mesne assignments, to Wright Aeronautical Corporation, Paterson, N. J., a corporation of New York Application July 23, 1937, Serial No. 155,174

20 Claims. (Cl. 248—5)

This invention relates to the mounting of a vibratory mass upon a support in such a manner as to control and isolate the vibration of the mass.

When a vibratory body is mounted on a support, the force impulses set up by the vibration of the body are transmitted to the support, and if a natural frequency of vibration of the body on the support is synchronous with the frequency of the force impulses, resonance results with a corresponding augmentation of the vibratory effect which may be very objectionable and may at times cause destructive stresses.

If we take as an example, a radial aircraft engine, force impulses are set up during its operation comprising translational forces and force couples acting in various directions. The aircraft power plant, which includes the engine and directly attached accessories, is capable of various independent modes of vibration with respective independent natural frequencies which are subject to excitation from the force impulses encountered in power plant operation. The essential vibratory motions which need be considered are (1) angular oscillation of the power plant about the crankshaft axis, which is usually referred to as torsional vibration; (2) angular oscillation of the power plant about an axis normal to the crankshaft passing through the power plant center of gravity, and (3) translational movement of the power plant along an axis normal to the crankshaft. Of these vibratory motions, (1) can be satisfactorily taken care of if elastic mounting devices are disposed between the power plant and mount symmetrically around the engine axis.

If the engine be mounted in the normal manner in a plane spaced from its center of gravity, "coupling" occurs between motions (2) and (3). That is, either a periodic couple or a periodic force applied at the center of gravity will produce a combination of translational and rotational movements of the power plant, "coupling" the two movements together, as a result of the action of only a single exciting force or couple. The natural periods are changed from those of modes (2) and (3) to such an extent that one of the modes of natural vibration will resonate within the range of power plant operating speeds, unless the mounting is made objectionably flexible or objectionably stiff. It has been the practice to arrange cylindrical rubber bushings tangentially around the engine in a plane spaced from the center of gravity of the power plant, these bushings assuming torsional vibration according to mode (1) in shear. In a plane normal to the rubber cylinder axis, the stiffness of the rubber in all directions is the same, so that when pure translational forces are imposed through the power plant center of gravity, the resulting deflection of the power plant is both linear and angular. Also, when a couple is imposed on the power plant, the resulting deflection is also both linear and angular. Accordingly, it is an object of this invention to organize an elastic engine mounting in such manner as to maintain the independent status of the motions (2) and (3), avoiding coupling therebetween, with a view toward holding natural frequencies at such a value as to lie outside the range of the exciting frequencies in the operating speeds of the power plant.

It is apparent that if the engine were mounted in a plane passing through its center of gravity, the natural vibration frequencies according to modes (2) and (3) would remain normal and independent, since the power plant, in response to a couple would oscillate without linear movement of its center of gravity, and in response to a force thru the center of gravity would move in a linear direction without oscillation. However, such a method of engine mounting introduces numerous mechanical difficulties. The conventional rubber mounting means are subject to rapid loss of effectiveness if subject to high temperatures, and since a plane passing through the power plant center of gravity contains the hot engine cylinders, it becomes difficult to isolate the rubber from the hot cylinders to permit of adequate life for the rubber. Further difficulties arise in the additional complication of structure necessary for a center of gravity mount. Accordingly, it is an object of the invention to teach a method of elastic engine mounting wherein the natural power plant frequencies retain their independent status, while at the same time, mounting the power plant in a plane spaced from its own center of gravity. To accomplish such an object it is necessary to overcome the normal tendency for coupling between vibration according to modes (2) and (3) above mentioned. In prior art structures, where engines have been elastically mounted in a plane spaced from the power plant center of gravity, this phenomenon of coupling has given frequencies in resonance with frequencies of exciting impulses in the operating speed range of the power plant.

In the conventional mount, the natural frequencies resulting from coupling of motions (2) and (3) depend upon the overhang of the engine with respect to the mount—that is, the distance between the mounting plane and the power plant center of gravity. Increases in this spacing cause an increasing spread of the natural frequencies. If the mount is made very elastic in the conventional manner, the natural frequencies may be controlled to a desired magnitude, but the mount becomes endowed with undue flexibility in unwanted directions. For instance, the static droop of the power plant becomes pronounced and the excursions thereof at low frequencies are objectionable. If the mounting structure is sufficiently stiff to properly suspend the power plant statically, the frequency of one of the modes of vibration will usually fall in the operating speed range.

The present invention sets out to provide an elastic mounting arrangement with the mount spaced from the power plant center of gravity, in which the power plant is supported statically in an adequate manner without undue droop, to the exclusion of large excursions at low frequencies; in which coupling action between the several modes of vibration is prevented; and in which, therefore, the mount according to this invention, procures a result substantially equivalent to one in which the power plant is mounted in a plane passing through its center of gravity.

Further objects will be apparent from a reading of the subjoined specification and claims, together with an examination of the accompanying drawings, in which similar numbers indicate similar parts, and in which:

Fig. 1 is a side elevation in diagrammatic form, of a power plant mount according to the invention;

Fig. 2 is a section on the line 2—2 of Fig. 1;

Fig. 3 is a diagram showing the forces acting in the mounting elements upon vertical displacement of the power plant;

Fig. 4 is a diagram showing the forces acting in the mounting elements upon angular displacement of the power plant;

Fig. 5 is a section through a preferred form of rubber mounting unit;

Fig. 6 is a side elevation of a power plant mounting embodying the units of Fig. 5;

Figs. 7 and 8 are side elevations of alternative forms of rubber mounting units;

Fig. 9 is a rear elevation of another form of elastic mounting, and

Fig. 10 is a section through the mount of Fig. 9.

Referring particularly to Figs. 1 to 4, inclusive, 10 represents a power plant, including all the parts movable therewith such as propeller, accessories and the like, provided with a plurality of mounting bosses 11 in a vertical plane spaced a distance $a$ from the power plant center of gravity represented as $c.\ g.$ The $c.\ g.$ represents the point of virtual support for the power plant. Should some other point of virtual support be desired, it would be substituted for "$c.\ g.$" as herein identified. Slightly rearwardly spaced from the mounting plane is a mounting structure 12 carrying a ring frame 13 symmetrically disposed about the power plant axis. Four equally spaced spring mounting sets extend from the ring 13 to the several lugs 11, each set comprising a spring 14 whose axis intersects the power plant axis a distance $x'$ forward of the $c.\ g.$, making with the engine axis an angle $\phi'$. Extending in a direction parallel to the engine axis from each lug 11 to the ring frame 13 is a spring 15. From each lug 11, springs 16 and 17 extend in opposite directions tangentially to the mounting circle to attaching points 18 on the ring 13. It may be noted that the effective mounting radius is designated by the letter $m$. By the proper relationships between the factors $m$, $a$ and $\phi'$, and the stiffness ratios between the several springs 14, 15, 16 and 17, the form of dynamic suspension is obtained, whereby forces imposed on the power plant at its $c.\ g.$ will cause only parallel translational movement of the engine as a unit, and likewise, couples acting on the power plant will produce only oscillation of the power plant about its $c.\ g.$ without any translation thereof. Figs. 3 and 4 indicate by vectors how an equilibrium condition obtains, due respectively to a linear displacement of the power plant, and to a polar movement thereof about the $c.\ g.$ In this discussion, it is presumed that these linear movements and polar movements are of a small order, so that the geometrical relationship of the various parts remains substantially the same. Likewise, forces acting upon the several springs act only along their axes, which is a true condition for helical springs pivotally attached at their ends to two members.

In Fig. 3, we may assume a downward linear displacement of $\Delta y$, the vertical axis, being the $y$ axis, and the horizontal axis being the $x$ axis. Assuming that the proper relationship of the several parameters exists (this relationship being defined mathematically later), there will be no stress imposed on the springs 15, nor on those springs 14, 16 or 17, which lie in horizontal planes. The vertical springs 16 and 17 will produce an upwardly directed vertical reaction $V_1$ acting at the mounting plane, at the distance $a$ from the $c.\ g.$, producing a clockwise moment $a\ V_1$ about the power plant $c.\ g.$ The upper spring 14 will produce an oblique force $O_1$ pulling upwardly, and rearwardly, while the lower spring 14 will be compressed and will exert an oblique force $O_2$ acting upwardly and forwardly. These forces act along the axes of the respective springs 14, and are therefore shown as acting at the intersection of the axes of the springs with the axis of the power plant. Each of these forces may be resolved into vertical and horizontal components. The vertical components are additive and their sum is designated as $V_2$ acting on the moment arm $x'$ and produce thereby a counterclockwise moment $V_2 x'$. The horizontal components of $O_1$ and $O_2$ are equal and opposite, and therefore cancel each other. For the equilibrium condition $V_1 a$ and $V_2 x'$ must be equal and, with the system designed properly, equilibrium obtains, whereby the $\Delta y$ displacement has produced no rotational component tendency in the power plant, and coupling has thus far been avoided. The sum of $V_1$ and $V_2$ will act through the $c.\ g.$ as a restitutional force to oppose $\Delta y$.

Fig. 4 represents the condition where the engine is displaced angularly through an angle of $\Delta \theta$ clockwise, as shown. With such rotational displacement, the top spring 15 is stretched and the bottom spring 15 is compressed, causing, respectively, left and right reactions. Those of the springs 16 and 17 which are vertical will effect a downward vertical reaction in the mounting plane. The upper spring 14 will be tensioned, causing an upward and rearward oblique reaction, and the lower spring 14 will be compressed, causing an upward and forward oblique reaction. The reactions of the springs 15, added to the horizontal components of the reactions of the springs 14, produce pure couples opposed to the $\Delta \theta$ displacement. The downward reactions of those springs 16 and 17 which are vertical will be exactly balanced by the upward reactions of the vertical components of the springs 14 in the mounting plane. Thereby, linear equilibrium is the result, with only a couple acting in opposition to Δθ and accordingly, the desired result is obtained of a pure couple reaction to a pure angular movement of the power plant. It has been found that, if the parameters of the mount are so selected as to allow only of translational displacement due to the action of a force on the c. g. of the power plant, that conversely, only angular displacement, without translation, will result from the imposition of a couple on the power plant.

It will readily be appreciated that pure torsional impulses in a plane normal to the crankshaft axis will act upon the springs 16 and 17 only. Forces acting through the c. g. along any normal to the power plant axis will produce linear displacements of the power plant without rotation, since the summation of the forces acting in the various springs about the ring 13 will have an effect the same as that just described in detail. Likewise, couples acting in any plane which includes the power plant axis, will produce a summation of spring reactions providing for oscillation of the power plant about its own c. g. The number of sets of such mounting devices may be any number greater than two without affecting the general result.

The identical function may be accomplished by utilizing in an appropriate manner, any elastic mounting devices, for instance, rubber, having several principal axes of different stiffnesses.

A flexible connecting member may be said to have three intersecting right angled axes of principal stiffness, hereafter called "principal axes". These axes are distinguished from others by the following property; if one part of the member is fixed and a force be applied to another part along a principal axis, the displacement of the free part is in the direction of the applied force. The stiffness along all three axes may be equal, in which case, all axes of the body are principal axes, of equal stiffness. Or, the stiffness along two principal axes may be equal and the third different, in which case any axis in the plane of the two axes of equal stiffness is an equivalent principal axis. In case the stiffness along all three axes is different, there are only these three axes of principal stiffness through a given point.

Figs. 5 and 6 show a preferred form of elastic mounting device, comprising what might be termed a "rubber sandwich". The sandwich unit comprises a pair of rubber annuli 20 bonded to a central metal plate 22 having a central opening for the reception of a bolt 24, the bolt being made fast to the plate 22 by nuts 25. The bolt passes perpendicularly through one of the rubber annuli and is rigidly attached to the power plant 10, the axis of the annuli making an angle φ with the power plant axis, this axis being a principal axis of relatively great stiffness. The outer face of each rubber annulus is bonded to a metal plate 26 having a central opening for passage of the bolt 24 and having peripheral openings for the reception of bolts 28, which serve to hold the plates 26 in spaced relation and also serve to attach the sandwich unit to a mounting plate 30 integral with the mounting ring 13. A plurality of these sandwich units are evenly spaced about the circumference of the mounting circle on the power plant and ring. Each of these sandwich units, by its construction, has a relatively great stiffness in a direction along the axis of the annuli and bolt 24, due to tension and compression of the rubber, and has a relatively lesser stiffness in a plane normal to said axis by virtue of shear in the rubber. The application of such a unit subscribes generally to the teachings outlined above, except that each of the several mounting units partakes of a combination of axial and shear movement when the power plant is displaced either translationally or rotationally with respect to the mounting structure. The proper design of these mounting units must take into consideration the restitutional effect of the rubber along the several principal axes of movement thereof, but it is relatively simple, by evaluating the stiffness relationships between the three principal axes to set up a relationship, in cooperation with the factors $m$, $a$ and $\phi$, previously defined, to establish a quantitative design formula for the device. Such a formula is indicated below:

$$\frac{a}{m} = \frac{1}{2} \cdot \frac{\sin 2\phi}{\frac{L_2+1}{L_1-L_2}+\sin^2\phi}$$

$L_1 = \dfrac{\text{spring rate along that line making the angle } \phi \text{ with the engine axis}}{\text{spring rate along a line tangent to the mounting circle}}$ $L_2 = \dfrac{\text{spring rate along a line normal to both lines in the } L_1 \text{ expression above}}{\text{spring rate along the line tangent to the mounting circle}}$ The number of symmetrically spaced mounting units is immaterial in attaining the properties desired, so long as there are more than two. The design of the rubber units to subscribe to the requirements of relative stiffness may be accomplished by referring to known data on this subject. The spring rates of the rubber elements are primarily a function of the area and thickness of rubber involved, and the hardness of the rubber.

Fig. 7 shows an alternative arrangement for a rubber mounting device wherein a rubber cylinder 32 is bonded on its outer cylindrical surface to a sleeve 34 attached to the mounting ring 13 in a tangential position. The rubber element is provided with a central bore bonded to a sleeve 36 through which passes a bolt 38 which in turn is rigidly carried by the power plant 10 through arms 40. The rubber element 32 has formed therein perforations 42 whose axes lie in a plane normal to that line which makes the angle φ with the power plant axis. In this device, the stiffness of the rubber is greatest along that line which makes the angle φ with the engine axis, while the stiffness in planes normal thereto is substantially less. The torsional effect of the engine in its mount is taken up by the shear stress in the rubber cylinder in the conventional manner. The stiffness ratios of the rubber along the various principal axes thereof may be determined in accordance with design requirements.

Fig. 8 shows another alternative arrangement in which a conventional rubber cylinder 46 is embraced by a sleeve 48 bonded to the rubber, which sleeve is in turn made rigid with the power plant 10 through a bracket 50. A sleeve 52 bonded to the bore surface in the rubber cylinder is attached by means of a bolt 54 and a bracket 56 to the mounting ring 13. In this instance, the cylinder 46 is mounted with its principal shear axis in a plane which includes the engine axis, and with a normal to said principal shear axis, making the angle φ with the engine axis. In this design, the torsional stiffness of the mounting assembly would be greater than that given by the two previously described embodiments, so that torsional vibration according to motion (1), previously defined, would be resisted by relatively stiff vibration isolating devices. The rubber is in compression and tension along the line making the angle φ with the power plant axis, while the more resilient shear axis is normal thereto.

Figs. 9 and 10 show a further alternative arrangement, wherein the power plant 10 is rigidly attached to a channeled annulus 60 having the channel groove 62 opening inwardly and rearwardly relative to the power plant. An annular tongue 64 enters the groove 62, and is carried by the mounting ring 13 or its equivalent. The tongue 64 is held midway of the flanges of the annulus 60 by means of rubber annuli 66 and 68 bonded at their end faces to members 60 and 64. The principal axis of greatest stiffness of any circumferential segment of the system makes the angle φ with the power plant axis, while the other principal axes have lesser stiffness due to shear stress in the rubber. This embodiment is calculable by the same methods as would be followed in connection with the other embodiments herein shown.

It will be apparent to those skilled in the art that numerous elastic mounting mechanisms may be evolved to meet the general requirements of dynamic suspension herein taught, so that the specific embodiments shown are not intended to limit the scope of the invention. It should also be pointed out that, in the mounting of a dynamic body, it may be desired to select some point of virtual support other than the center of gravity of the vibrating body, in which case, such point of virtual support is used in lieu of the center of gravity in applying the teachings of this invention. The resilience of the normal mounting structure rearward of the mounting plane might dictate the use of some point of virtual support other than the center of gravity of the vibrating mass.

The invention is described above as applied to mounting devices symmetrically located about the shaft axis of a power plant, but it is wholly within the teaching hereof to have the mounting devices symmetrically disposed about any other axis passing through the center of virtual support of a vibratory body. The teachings hereof may likewise be applied to a mounting structure asymmetrical with respect to an axis through the center of virtual support of the body, in which case, the several mounting devices, springs or the like, would be designed according to their specific locations in the system.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In an elastic mounting system, a vibratory body including a point at which the body is desired to be virtually supported, a mounting structure, and a plurality of elastic mounting devices lying substantially in a plane spaced from the body center of gravity and connecting said structure and said body, said devices including principal axes A and B along which the devices have respectively relatively high and low spring rates, said devices being so disposed that the axes A intersect at a point more remote from the mounting devices and on the same side thereof relative thereto as the point of virtual support of said body.

2. In an elastic mounting organization, a structure having a plurality of mounting points all lying in a plane, a vibratory body having its center of gravity spaced from the plane of said points, and a plurality of elastic connections from said points to said body, said connections each having a principal axis A along which the spring rate is higher than on any other axis thereof, said axes A converging from respective connections to a point in said body more remote from the mounting plane than the center of gravity of the body.

3. In a mounting system including supports in a vertical plane and a body having its center of gravity spaced horizontally therefrom, means to prevent coupling of the natural linear and angular modes of vibration of the body comprising resilient devices joining the body to said supports, said devices each having a plurality of principal axes along which the respective devices have different spring rates, said axes being so arranged geometrically that said devices provide for said body a virtual support at the body center of gravity despite the spacing of the center of gravity of the body from the support plane.

4. In combination, a support structure, a power plant, the center of gravity of the power plant overhanging from said structure, and mounting devices substantially in a plane spaced from the power plant center of gravity having elements, separated by rubber or other elastic material attached respectively to said power plant and structure, each device having only a single principal axis along which the rubber is subject to compressive and tensile deformation only, said axes sloping from respective devices to an intersection with the power plant axis ahead of the power plant center of gravity.

5. A cantilever power plant mount including a mount structure and a power plant disposed forwardly thereof and overhanging therefrom, spaced resilient connecting means between the engine and the structure each having principal axes along which the respective means have different spring rates, said spring rates being of such order and said axes being so arranged geometrically as to provide a virtual support for said power plant substantially at its center of gravity, whereby translational movement only of the power plant results from the application of a linear force at the center of gravity thereof, and whereby angular movement only results from the application of a couple thereto.

6. An aircraft power plant including a rigid mounting structure and an engine-propeller assembly overhung from the structure with the assembly center of gravity spaced therefrom, connections between the structure and the engine, said connections having right-angled principal axes A and B along which the connections have respectively relatively high and low spring rates, the several axes A together defining a cone having its apex in a plane more remotely spaced from the mounting structure than the engine-propeller assembly center of gravity.

7. In an aircraft power plant, annularly disposed mounting fittings lying in a substantially vertical plane, an engine-propeller assembly having its center of gravity substantially coaxial with and spaced forwardly from said fittings annulus, and at least three equally circumferentially spaced similar connections joining said fittings and engine, each connection comprising resilient means having different spring rates in different directions therethrough, and means for holding said resilient means in attitudes such that the direction of action of the greatest spring rate of each is on a line intersecting the assembly axis and concentric with the fittings annulus at a point forward of the center of gravity of the assembly.

8. In a mounting system, a rigid structure, a body comprising a rotating part overhung therefrom and having the principal rotating axis thereof passing through the structure and adjasent the body center of gravity, said center of gravity being spaced ahead of the structure, resilient means connecting the body and the structure having at least two principal axes A and B along which the means has different spring rates, said two axes A and B lying in a plane including said body axis and respectively intersecting said body axis of gravity of the body ahead of the center and rearward of the resilient means.

9. In a mounting system, a rigid structure, a vibratory body having an axis thereof passing through the structure and the body center of gravity, said center of gravity being spaced from the structure, and a plurality of devices disposed around said axis connecting the body and structure each having principal axes A and B along which the devices have respectively high and lower spring rates, axes A and B lying in a plane including said body axis, axis B intersecting said body axis on the opposite side of said devices from the body center of gracity, and the axis A intersecting said body axis on the same side as and more remote from said devices relative to the center of gravity of the body.

10. In a mounting system, a rigid structure, a vibratory body having an axis thereof passing through the structure and the body center of gravity, said center of gravity being spaced from the structure, and a plurality of devices disposed around said axis connecting the body and structure each having principal axes A, B and C along which the devices have respectively a high spring rate as for axis A and lower spring rates as for axes B and C, said axes A and B lying in a plane including said body axis, axis B intersecting said body axis on the opposite side of said devices from the center of gravity of the body, axis A intersecting said body axis on the same side as and more remote from said devices relative to the center of gravity of the body, and axis C being normal to axes A and B.

11. An aircraft power plant including a rigid planar mount and an engine assembly having its center of gravity spaced from the plane of the mount and lying on an engine axis which is normal to the mount plane, yieldable means annularly disposed relative to said axis attaching said engine to said mount, said means including principal axis A and B along which the means have differential spring rates respectively high and lower in the order above named, axis B intersecting the engine axis at such a point that the plane of the mount lies between the indicated intersection and the engine center of gravity, and axis A intersecting the engine axis beyond the engine center of gravity relative to said mount plane.

12. In an aircraft power plant, a mounting ring, an engine having its center of gravity spaced from and substantially coaxial with said ring, and annular elastic means coextensive with said ring connecting said engine and ring, elastic elements of said means having principal axes A and B along which the means has respectively high and lower spring rates, the axes A of respective elements sloping from said ring to intersect the ring axis at a point forwardly spaced from the engine center of gravity.

13. In an aircraft power plant, a mounting ring, an engine having its center of gravity spaced from and substantially coaxial with said ring, and annular elastic means coextensive with said ring connecting said engine and ring, elastic elements of said means having principal axes A, B and C along which the means has respectively a high spring rate as for axis A and lower spring rates as for axes B and C, the principal axes A of respective elements sloping from said ring to intersect the ring axis at a point forwardly spaced from the engine center of gravity, the principal axes B of respective elements sloping from said ring to intersect the engine axis rearwardly of the ring, and each other principal axis C of respective elements lying tangent to the ring.

14. In a mounting system, a vibratory body, a substantially coplanar mounting structure laterally spaced from the center of gravity of the body, and a plurality of mounting devices disposed in a circle connecting the structure and the body at spaced intervals, each said device comprising a cylindrical rubber bushing and concentric elements, spaced by the rubber, attached respectively to the structure and body, the axis of said bushings lying tangent to the circle, the rubber of the bushing being relieved at opposite sides of the bushing axis, said bushing being so turned with respect to the coacting concentric elements that the solid rubber portions thereof are on a line normal to the bushing axis which intersects other similar lines of other bushings at a point more remote from the mounting structure than the body center of gravity.

15. In a mounting system, a vibratory body, a substantially coplanar mounting structure laterally spaced from the center of gravity of the body, and a plurality of mounting devices disposed in a circle connecting the structure and the body at spaced intervals, said devices comprising substantially cylindrical rubber bushings having their axes tangentially disposed relative to the circle, elements attached to the inner and outer cylindrical surfaces of the bushing, said elements being attached to the structure and body, and said bushings being so relieved along diameters thereof as to afford a high spring rate along lines which intersect one another at a point more remote from the structure than the body center of gravity and to afford a relatively lower spring rate along lines which intersect at a point on the opposite side of the mounting structure from the body center of gravity.

16. In a mounting system, a vibratory body, a substantially coplanar mounting structure laterally spaced from the center of gravity of the body, and a plurality of mounting devices connecting the structure and the body at spaced intervals, said devices comprising spaced plates alternately attached to the structure and body and rubber elements fixed to and between adjacent plates, the several devices being positioned so that a normal to the several plates of each device intersects similar normals of other devices at a point more remote from the mounting structure than the body center of gravity.

17. In a mounting system, a vibratory body, a substantially coplanar mounting structure laterally spaced from the center of gravity of the body, and a plurality of mounting devices connecting the structure and the body at spaced intervals, said devices each comprising a cylindrical rubber bushing, concentric structural elements attached to the bushing and separated by the rubber thereof attached respectively to the structure and the body, and the axes of said bushings coincidentally intersecting one another at a point on the opposite side of the mounting structure from the body center of gravity.

18. In an engine mount, a support, a plurality of resilient coplanar mounting devices symmetrically disposed on a circle thereon, a power plant attached to said devices, said devices having right-angled principal axes along which their spring rates are different, the geometry of the mounting organization substantially subscribing to the formula—

$$\frac{a}{m} = \frac{1}{2} \cdot \frac{\sin 2\phi}{\frac{L_2+1}{L_1-L_2} + \sin^2 \phi}$$

wherein $a$ is the distance from the plane of the mounting devices to the power plant center of gravity; $m$ is the radius of the mounting circle; $\phi$ is the angle between the mounting circle axis and the line along which each mounting device has the highest spring rate; $L_1$ is the ratio of the spring rate of each device along the line which makes the angle $\phi$, to the spring rate of each device along the mounting circle tangent; and $L_2$ is the ratio of the spring rate of each device along a line normal to the line which makes the angle $\phi$ and normal to the mounting circle tangent, to the spring rate of each device along the mounting circle tangent.

19. In a mounting system including a support and a body mounted thereon, means to prevent coupling of the natural linear and angular modes of vibration of the body comprising resilient devices forming the mount and joining the body to said support, and lying in a plane spaced from the center of gravity of the body, said devices each having a plurality of principal axes along which respective devices have different spring rates, said axes being so arranged geometrically that said devices provide for said body a virtual support at the body center of gravity despite the spacing of the center of gravity of the body from the plane of the resilient devices.

20. In a mounting system including a support and a body mounted thereon, means to prevent coupling of the natural linear and angular modes of vibration of the body comprising resilient devices forming the mount, joining the body to said support, and lying in a plane spaced from the center of gravity of the body, said devices each having one principal axis A along which the spring rate is high and another principal axis B along which the spring rate is relatively lower than that along the axis A, said axes A and B of the several resilient devices being so arranged geometrically that said devices provide for said body a virtual support at the body center of gravity despite the spacing of the center of gravity of the body from the plane of the resilient devices.

EDWARD S. TAYLOR.